G. MILKE.
DEVICE FOR ROLLING AND FORMING BATCHES OF CANDY IN CONFECTIONERY.
APPLICATION FILED AUG. 9, 1916.
1,330,764. Patented Feb. 10, 1920.
2 SHEETS—SHEET 2.
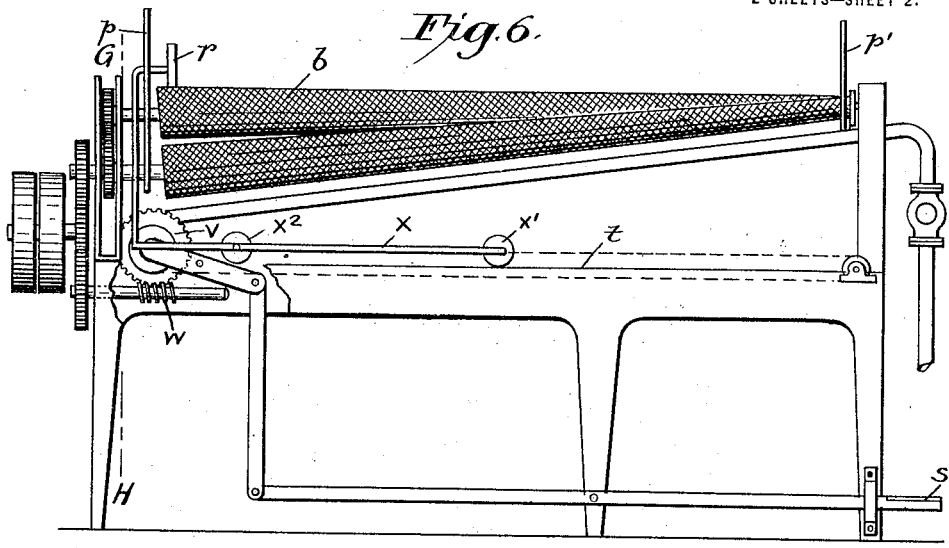
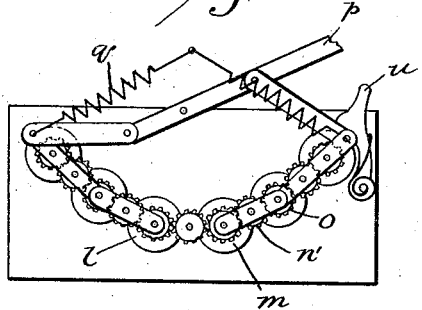
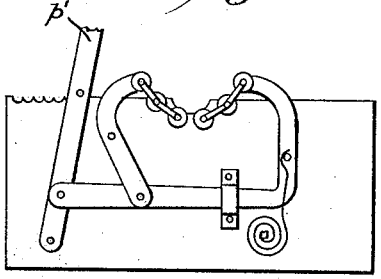
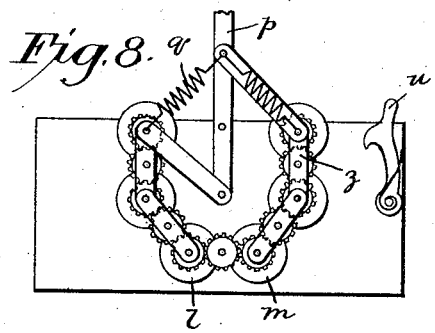
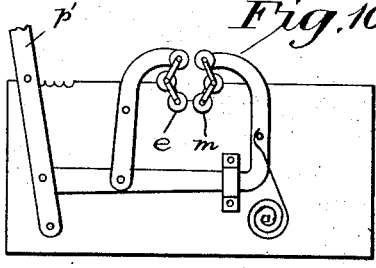
Gustav Milke
Inventor:
by Emery, Varney, Blair & Hyatt
his attorneys.

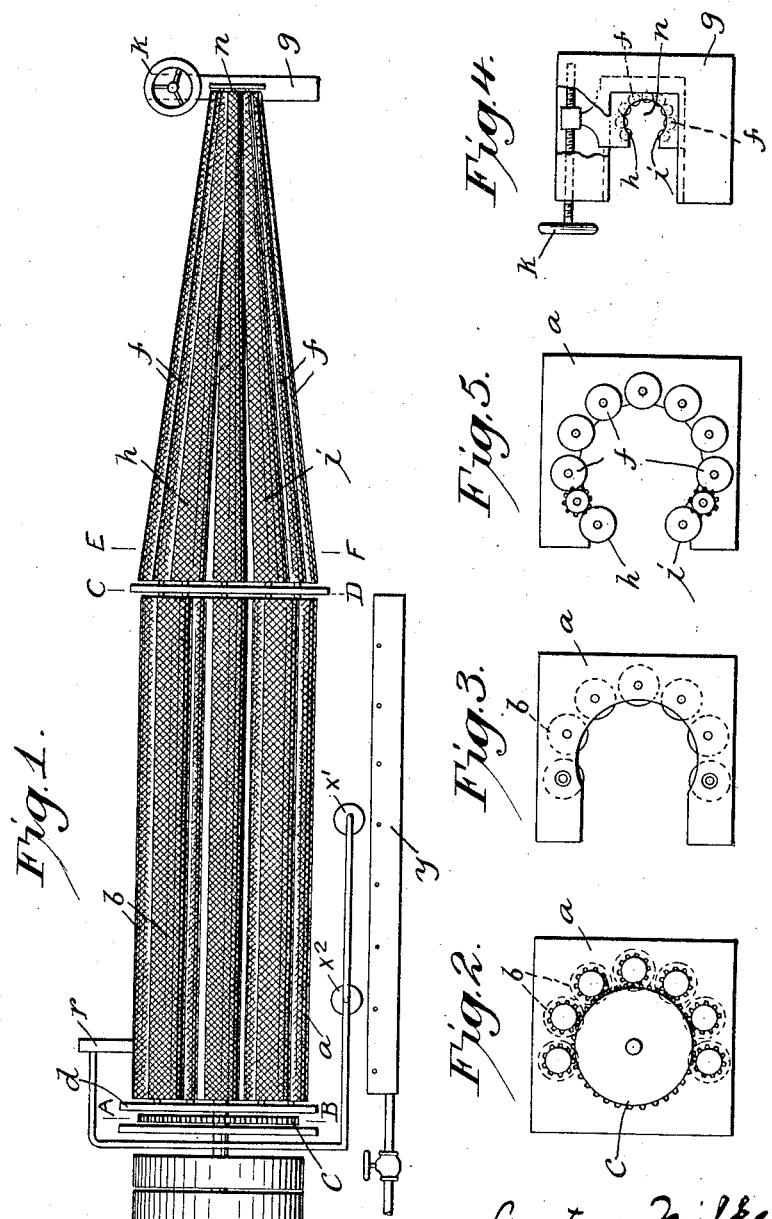

UNITED STATES PATENT OFFICE.

GUSTAV MILKE, OF DRESDEN, GERMANY, ASSIGNOR, BY MESNE ASSIGNMENTS, TO THE CHEMICAL FOUNDATION, INC., A CORPORATION OF DELAWARE.

DEVICE FOR ROLLING AND FORMING BATCHES OF CANDY IN CONFECTIONERY.

1,330,764. Specification of Letters Patent. Patented Feb. 10, 1920.

Application filed August 9, 1916. Serial No. 113,963.

*To all whom it may concern:*

Be it known that I, GUSTAV MILKE, a subject of the King of Saxony, and a resident of Dresden-A, Germany, Chemnitzerstrasse 28, Kingdom of Saxony, have invented certain new and useful Improvements in Devices for Rolling and Forming Batches of Candy in Confectionery, of which the following is a specification.

In producing confectionery heretofore the batch of candy for making drops, as for instance "rocks" or the so-called "silk-drops" generally is formed and rolled by hand.

This method occasioned a great loss of time and without employing a great number of workmen. All attempts to improve the manual method failed on account of the adhesiveness of the material to be treated.

Several devices for mechanically rolling the batch of candy are known. The present invention however differs from these known devices in that the batch of candy is simultaneously rolled and reduced in diameter and automatically discharged at the outlet of the machine, and means for lifting and lowering the head of the machine and heating the tray are provided.

Furthermore the invention comprises the press-rollers arranged as a series of loose-chain members, springs for the control of the press rollers by pressing said rollers down upon the batch of candy to be treated, a disk being provided between said rollers to move the candy material forward if desired.

In the drawings the subject-matter of the invention is represented by way of example, wherein—

Figure 1 represents the device in elevation,

Fig. 2 is a section according to line A—B, in Fig. 1,

Fig. 3 a section according to line C—D, in Fig. 1,

Fig. 4 is a front view,

Fig. 5 a section according to line E—F in Fig. 1,

Figs. 6 to 10 represent the rollers forming members of a loose chain,

Fig. 6 being a side-view,

Figs. 7 and 8 a section according to line G—H, in Fig. 6, of the arrangement wherein the rollers form members of a loose chain as represented in Fig. 6, Figs. 9 and 10 a view of the discharge mechanism in two different positions of the rollers.

Referring now to the drawings the device consists of a tray $a$, wherein a lump of candy is inserted in order to be treated. Rollers $b$ are provided and driven by a toothed wheel $c$ or the like. Said rollers are journaled at $d$ and $e$ in the tray-like frame $a$. They project beyond $e$ in form of cone-shaped rollers $f$ pointed at their upper ends, which are likewise disposed within the tray and connected to the rollers $b$ by a muff-coupling or the like, not shown in the drawings. Each roller $b$ corresponds in this way to one roller $f$. Above rollers $f$ two single cone-shaped rollers $h$ and $i$ are provided. Said rollers $h$ and $i$ are not driven by the rollers $b$ but may be driven by any of the lower rollers as they are not in immediate connection with the rollers $b$. $n$ is the outlet or discharge of the tray for the discharge of the finished batch of candy. A head $n^1$ normally closes this outlet. Said head may be lowered and lifted by means of the screw $k$.

The mode of operation is as follows:

The lump of candy is brought into the tray $a$, rolled therein by means of the rollers $b$, and finally formed by the cone-shaped rollers $f$ so that it may be discharged at the outlet $n$. The drive may be effected by means of a flexible gearing driving the toothed wheel $c$ which latter influences the smaller toothed wheels of the rollers $b$, whereby rotation of the latter is effected.

The cone-shaped rollers $h$ and $i$ are preferably driven from the rollers $f$ by means of a toothed wheel. It is evident that the manner of driving the rollers may be varied and modified if desired.

In Figs. 6 to 10 the rollers $b$ are made integral and cone-shaped. The two middle rollers $l$ and $m$ are fixedly mounted, whereas the other rollers are connected by means of the links $z$ (Figs. 7 and 8) and are driven by the toothed wheels $o$, thereby forming a kind of chain. $p$ is a rod which is connected to said chain, while springs $q$ are provided for pressing the rollers down upon the batch of candy. By actuating said rod $p$ the chain of rollers is separated, that is to say brought in the position according to Fig. 7; hereafter the batch of candy is inserted and the rod $p$ released so that the rollers close themselves around said batch of candy and begin to act upon the same as soon as the machine is set at work. Between the rollers $b$, the disk $r$ is provided. Said disk $r$ is connected with the treadle $s$. As soon as the operator treads the same, the disk $r$ moves forward and pushes the batch of candy toward the middle of the tray. The movement may be transmitted in any desired way. In the present case the movement of the treadle $s$ is transmitted to said disk $r$ by a wheel $w$ and worm $v$ which possesses a two-armed lever $x$, provided with little wheels $x^1$, $x^2$ adapted to move in forward direction as the wheel $v$ is moved forward by the treadle. Said lever is connected with its other end to the disk $r$, so that according to the movement of the described parts the disk $r$ will be moved forward respectively. In order to insert the batch of candy in the above described way the pawl $u$ is provided which arrests the chain of rollers, when separated, by pressing down the lever $p$ until the batch of candy is inserted.

The operation of the above described apparatus is as follows:

By means of the lever $p$ the chain of rollers is separated and the pawl $u$ locks the rollers in the position shown in Fig. 7. The batch of candy may then be inserted. The pawl $u$ is released and the rollers act uniformly upon the batch of candy. At the front of the device the batch of candy is discharged as usual. Due to the spring-pressure the rollers completely surround the batch of candy as long as they work the same. If it is desired to move the batch of candy forward, the operator depresses the lever $s$, whereby the toothed wheel $v$ engages the worm $w$. The plate $r$ is supported by a frame construction carried by two rollers adapted to run along the runways $b$. This frame is connected to a rope which passes forwardly around a pulley at one end of the runway and thence rearwardly to a drum $b$ around which it is wound. The drum $b$ is actuated at the will of an operator, as aforestated, by means of the worm gear $w$ which is suitably power driven, and the one secured to the drum. From the above construction it will be seen that by means of the foot treadle, the drum and the worm gear secured thereto may be raised or lowered to engage the latter with the worm $w$ and thereby operate the drum to wind up the rope coiled thereabout and thereby move the plate $r$ to press the candy toward the discharge end of the rollers $b$.

It will be seen that the sugar material is rolled, simultaneously pressed, and brought to a certain predetermined diameter and automatically discharged at the end of the cone-shaped rollers.

The rollers consist preferably of metal and are covered by a fine-meshed sieve in order to avoid adherence of the batch of candy.

Heat may be applied either to the tray $a$ or to the rollers by means of a suitable burner $y$ in order to attain the necessary density of the candy. The means for heating the tray and the rollers are not illustrated as they may be of any desired kind.

As shown in Figs. 9 and 10 the discharge rollers are provided with an opening and closing mechanism, comprising an operating lever $p'$ pivoted at $p^2$, which operating lever is connected at a point somewhat above its pivot point to a slidable lever $p^3$ which acts against the tension of a spring $p^4$. Pivoted to the lever $p^3$ is a secondary lever $p^5$ pivotally secured to the base at $p^6$.

It will be seen that upon moving the lever $p'$ into the position shown in Fig. 9, the rollers $f$ will be opened by reason of the fact that the slidable lever $p^3$ will be moved away from center, the spring $p^4$ assisting in this operation. Because of the pivotal arrangement of the lever $p^5$, the upper end of this lever will also be moved away from center and, as the rollers $f$ are connected at their outer ends to the levers $p^3$ and $p^5$ respectively, they will be opened. It will be further seen that all that is necessary in order to bring the rollers to a closed position is to move the lever $p'$ into its other extreme position, thus causing a moving toward the center of the levers $p^3$ and $p^5$ and a consequent carrying with them of the rollers $f$.

I claim:

1. In a device for rolling a batch of candy, rollers for rolling the batch of candy so disposed as to be in the form of a chain, said rollers being subject to the action of a spring, cone-shaped rollers for reducing the diameter of the batch of candy while being rolled and means to push the material within the first named rollers in a forward direction.

2. In a device for rolling batch of candy, a tray, rollers for rolling the batch of candy within the tray, and cone-shaped rollers for reducing the diameter of the batch of candy, all of said rollers being formed of metal and covered by a gauze-like sieve, said tray and said rollers being heated for the purpose set forth.

Signed at Dresden, Saxony, this 17th day of June, 1916.

GUSTAV MILKE.

Witnesses:
CLARE SIMON,
BERT BRAUN.